US012769703B2

(12) United States Patent
Curtis-Maury et al.

(10) Patent No.: US 12,769,703 B2
(45) Date of Patent: Oct. 20, 2026

(54) SUPPORTING A LOOKUP STRUCTURE FOR A FILE SYSTEM IMPLEMENTING HIERARCHICAL REFERENCE COUNTING

(71) Applicant: NetApp, Inc., Sunnyvale, CA (US)

(72) Inventors: Matthew Fontaine Curtis-Maury, Apex, NC (US); Vinay Devadas, Apex, NC (US); Yash Hetal Trivedi, Cary, NC (US)

(73) Assignee: NetApp, Inc., San Jose, CA (US)

(*) Notice: Subject to any disclaimer, the term of this patent is extended or adjusted under 35 U.S.C. 154(b) by 81 days.

(21) Appl. No.: 18/786,742

(22) Filed: Jul. 29, 2024

(65) Prior Publication Data

US 2024/0385991 A1 Nov. 21, 2024

Related U.S. Application Data

(63) Continuation of application No. 17/060,400, filed on Oct. 1, 2020, now Pat. No. 12,050,553.

(51) Int. Cl.
*G06F 16/14* (2019.01)
*G06F 3/06* (2006.01)

(52) U.S. Cl.
CPC .......... *G06F 16/148* (2019.01); *G06F 3/0604* (2013.01); *G06F 3/0655* (2013.01); *G06F 3/067* (2013.01)

(58) Field of Classification Search
CPC .... G06F 16/148; G06F 3/0604; G06F 3/0655; G06F 3/067
USPC .......................................................... 707/769
See application file for complete search history.

(56) References Cited

U.S. PATENT DOCUMENTS

| | | | | |
|---|---|---|---|---|
| 6,032,216 | A | 2/2000 | Schmuck et al. | |
| 8,412,688 | B1 | 4/2013 | Armangau et al. | |
| 9,792,298 | B1 * | 10/2017 | Taylor ................ | G06F 16/1844 |
| 12,050,553 | B2 | 7/2024 | Curtis-Maury et al. | |
| 2011/0035376 | A1 | 2/2011 | Kirshenbaum | |
| 2013/0013654 | A1 | 1/2013 | Lacapra et al. | |

(Continued)

OTHER PUBLICATIONS

Final Office Action mailed Apr. 11, 2023 for U.S. Appl. No. 17/060,400, filed Oct. 1, 2020, 33 pages.

(Continued)

*Primary Examiner* — Tony Mahmoudi
*Assistant Examiner* — Kamal K Dewan
(74) *Attorney, Agent, or Firm* — COOPER LEGAL GROUP LLC

(57) ABSTRACT

Techniques are provided for supporting a lookup structure for a file system implementing hierarchical reference counting. A write operation to write data to a page maintained by the file system is received. A lookup within a lookup structure is performed using information related to the page in order to identify a lookup entry within the lookup structure. A hash generation count within the lookup entry is compared to a file system info generation count within a file system info object for a volume associated with the page. In response to the lookup entry generation count not matching the file system info generation count, a file system tree of the file system is traversed to determine a reference count for the page, and the write operation is implemented based upon the reference count. Otherwise, the lookup entry is utilized to access the page for processing the write operation.

20 Claims, 9 Drawing Sheets

(56) References Cited

U.S. PATENT DOCUMENTS

| | | | | |
|---|---|---|---|---|
| 2014/0006357 | A1* | 1/2014 | Davis | G06F 16/182<br>707/667 |
| 2014/0195754 | A1* | 7/2014 | Colgrove | G06F 3/0614<br>711/162 |
| 2014/0331011 | A1 | 11/2014 | Kesavan et al. | |
| 2014/0379672 | A1 | 12/2014 | Esaka et al. | |
| 2015/0278397 | A1 | 10/2015 | Hendrickson et al. | |
| 2016/0350006 | A1 | 12/2016 | Wang et al. | |
| 2016/0357743 | A1 | 12/2016 | Swaminathan et al. | |
| 2016/0366226 | A1 | 12/2016 | Friedman et al. | |
| 2017/0032005 | A1 | 2/2017 | Zheng et al. | |
| 2017/0083368 | A1 | 3/2017 | Bishop et al. | |
| 2017/0300550 | A1 | 10/2017 | Emberson et al. | |
| 2017/0308305 | A1 | 10/2017 | Goel et al. | |
| 2017/0315878 | A1 | 11/2017 | Purohit et al. | |
| 2018/0004437 | A1* | 1/2018 | Battaje | G06F 3/065 |
| 2019/0179805 | A1 | 6/2019 | Prahlad et al. | |
| 2021/0328593 | A1* | 10/2021 | Kesavan | G06F 16/14 |
| 2021/0334206 | A1 | 10/2021 | Colgrove et al. | |
| 2021/0342298 | A1 | 11/2021 | Mathews et al. | |
| 2021/0374017 | A1* | 12/2021 | Tobin | G06F 3/065 |
| 2022/0107916 | A1 | 4/2022 | Curtis-Maury et al. | |

OTHER PUBLICATIONS

Non-Final Office Action mailed on Aug. 29, 2023 for U.S. Appl. No. 17/060,400, filed Oct. 1, 2020, 37 pages.
Notice of Allowance mailed on Mar. 27, 2024 for U.S. Appl. No. 17/060,400, filed Oct. 1, 2020, 12 pages.
Notice of Allowance mailed on May 1, 2024 for U.S. Appl. No. 17/060,400, filed Oct. 1, 2020, 02 pages.

* cited by examiner

SUPPORTING A LOOKUP STRUCTURE FOR A FILE SYSTEM IMPLEMENTING HIERARCHICAL REFERENCE COUNTING

RELATED APPLICATIONS

This application claims priority to and is a continuation of U.S. application Ser. No. 17/060,400, filed on Oct. 1, 2020, now allowed, titled "SUPPORTING A LOOKUP STRUCTURE FOR A FILE SYSTEM IMPLEMENTING HIERARCHICAL REFERENCE COUNTING," which is incorporated herein by reference.

BACKGROUND

A node may implement a file system used to organize data within storage. In an example, the file system may store data within pages of storage, such as persistent memory or other types of memory. The file system may organize the pages according to a file system tree (e.g., a buffer tree) comprising a file system superblock as a root node, inofiles associated with inodes of files (e.g., root nodes of file trees for files), file trees comprises indirect pages (indirect nodes) and direct pages (leaf nodes) comprising user data of files, and/or other information. When an operation is received to access particular user data within a direct page, the file system tree can be traversed down from the file system superblock to the particular direct page comprising the user data.

In order to improve performance of the file system, some file systems may utilize a lookup structure, such as a buffer hash, a lookup table, or any other data structure, to circumvent the traversal of the file system tree, which can save time and resources. The lookup structure comprises lookup entries (e.g., buffer entries) for pages within the storage. A lookup entry for a page may comprise information, such as a pointer, used to access a physical location of the page within the storage. In this way, the lookup entry may be used to access the page without having to traverse the file system tree to locate the page, thus improving performance and reducing the time to process operations.

Other file systems may implement hierarchical reference counting for pages within storage. A reference count for a page may indicate how many times the page is referenced, such as by an active file system (e.g., a file system actively being used to store and access data within the storage), a snapshot (e.g., a point in time representation of data within a file system, such as within a volume), etc. Each page may be associated with a reference count for the page, which may be maintained as a local reference count. With hierarchical referencing counting, pages inherit reference counts of parent pages within the file system tree. Thus, a local reference count maintained by a page may not be the actual/correct reference count of the page because a parent page may have a different reference count, which is inherited by the page.

In order to determine the correct reference count for a page, the file system tree must be traversed. Knowing the actual/correct reference count for a page is important because a page cannot be written to if there is more than one reference to the page. If there is more than one reference to the page, then a copy of the page is created and the new data is written to the copied page, which is referred to as a copy-on-write operation. This is because there is another storage entity (e.g., a snapshot, the active file system, etc.) still referencing the original data of the page. Because hierarchical reference counting must traverse the file system tree in order to determine the correct reference count for a page, which can affect how operations targeting the page are executed, a file system implementing hierarchical reference counting cannot utilize a lookup structure for improved performance because the lookup structure is used to skip traversing the file system tree. Thus, such file systems cannot benefit from the performance improvement provided by lookup structures because lookup structures are incompatible with hierarchical reference counting.

DETAILED DESCRIPTION

Figure 1:
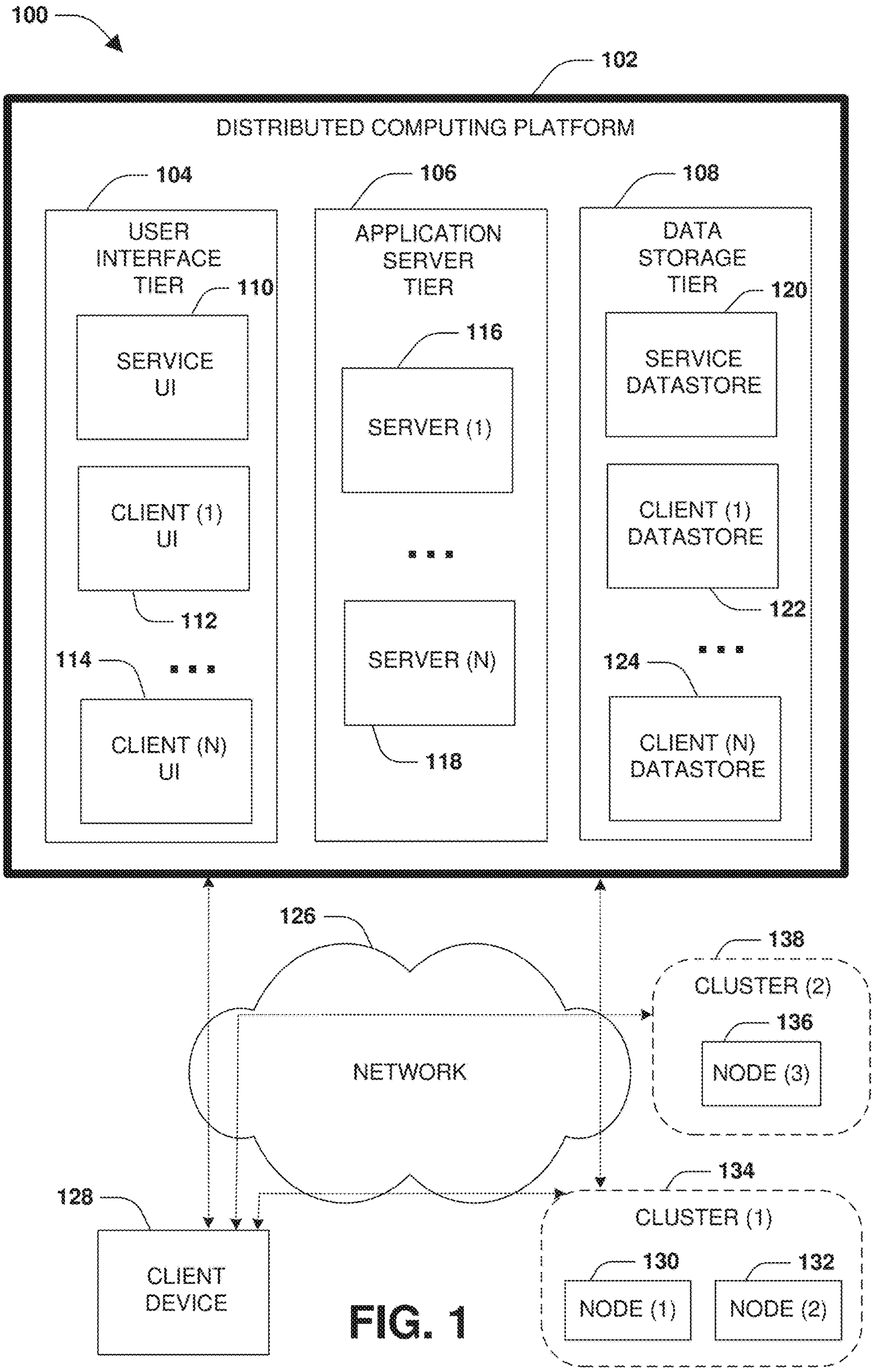
FIG. 1 is a block diagram illustrating an example computing environment in which an embodiment of the invention may be implemented.

The techniques described herein are directed to supporting a lookup structure for a file system implementing hierarchical reference counting. The lookup structure, such as a buffer hash, lookup table, etc., provides improved performance and reduced latency when processing operations targeting pages within storage. This is because lookup entries within the lookup structure can be used to directly access physical locations of a page within the storage without having to perform a time-consuming traversal of a file system tree to locate the page. Hierarchical reference counting allows pages to inherit reference counts from parent pages within the file system tree, and thus the file system tree must be traversed to identify actual/correct reference counts of pages. For example, a local reference count maintained by a page may have a value that is different than a reference count that is inherited by the page from a parent page, and thus the local reference count will not have the correct value.

Determining the actual reference count of a page is important because certain operations are implemented differently depending on the value of the reference count. For example, a page having a reference count greater than 1 cannot be directly written to by a write operation, but must be copied as a copied page and the write operation is executed upon the copied page. This preserves the original data within the page because other storage entities, such as a snapshot or active file system, still reference the original data. If the reference count is 1, then the write operation can be directly executed upon the page. Hierarchical reference counting provides the benefit that when a snapshot of a file system is created or deleted, merely a reference count of a root node of the file system tree is changed instead of having to traverse the entire file system tree and increment reference counts of all pages, which greatly reduces the time to create the snapshot.

Prior file systems are unable to implement both hierarchical reference counting and lookup structures, which are incompatible because lookup structures skip traversing a file system tree while hierarchical reference counting must traverse the file system tree. Thus, prior file systems that implement hierarchical reference counting cannot benefit from the decreased latency and improved performance otherwise provided by a lookup structure.

In contrast, the techniques provided herein, allow file systems to implement hierarchical reference counting for improving the efficiency of creating and deleting snapshots and file clones, along with also implementing a lookup structure, such as a buffer hash, for improving performance and decreasing latency of executing operations. In particular, a traditional file system tree and lookup structure of a file system are augmented with additional information in order to make the file system compatible with both the lookup structure and hierarchical referencing counting.

In some embodiments, lookup entry generation counts are added into lookup entries within the lookup structure and a file system info generation count is added into a file system info object. A lookup entry generation count of a lookup entry for a page can be compared to the file system info generation count to determine whether the lookup entry can be used to access the page. If the values of these generation counts match, then a local reference count maintained by the page is correct and the lookup entry can be used to directly access the page without having to traverse the file system tree. If the values of these generation counts do not match, then the lookup entry cannot be used and a traversal of the file system tree is performed to identify the actual reference count because the local reference could be incorrect. This technique can be used to handle how snapshots are created/deleted using hierarchical reference counting where merely the file system info generation count is incremented and all pages below the file system info object will inherit the modified value, thus invalidating the local reference counts of these pages because the local reference counts are not updated by snapshot create and delete operations.

In some embodiments, each file within a file system will be assigned a unique file identifier, and is also associated with a hash identifier list of hash identifiers assigned to a file and inherited by the file from parent files (e.g., a parent file from which the file was cloned). The list of hash identifiers of a file is used to query the lookup structure to identify lookup entries of pages comprising data of the file, as opposed to merely using the single file identifier assigned to the file. This allows for the identification of lookup entries for pages of a parent file that are shared with the file because a hash identifier of the parent file is inherited by the page and stored within the hash identifier list. This technique can be used to handle how the cloning of a parent file to create a cloned file will result in a new file identifier being assigned to the cloned file. If only file identifiers were used to locate corresponding lookup entries within the lookup structure, lookup entries for pages shared between the parent file and the cloned file cannot be identified because the new file identifier of the cloned file is different than a file identifier of the parent file. Instead, this technique indexes lookup entries by hash identifiers, and maintains lists of hash identifiers that can be used to identify lookup entries within the lookup structure, such as lookup entries for pages comprising data shared by a file and a cloned file that is a clone of the file.

Various embodiments of the present technology provide for a wide range of technical effects, advantages, and/or improvements to computing systems and components. For example, various embodiments may include one or more of the following technical effects, advantages, and/or improvements: 1) allowing a file system to implement both hierarchical reference counting and a lookup structure that would otherwise be incompatible; 2) implementing hierarchical reference counting so that pages can inherit reference counts of parent pages, thus allowing for efficient snapshot and file clone creation/deletion, along with other operations that would otherwise have to traverse a file system tree to modify a large number of individual reference counts, which can be time consuming; 3) implementing a lookup structure such as a buffer hash to circumvent having to traverse the entire file system tree in certain circumstances where local reference counts of pages can be trusted as being correct, which improves performance and reduces latency otherwise caused by performing the full file system tree traversal; 4) handling file clone operations and snapshot operation in the context of implementing the lookup structure and hierarchical reference counting in manner that circumvents instances where incorrect reference counts would otherwise be used and/or lookup entries of pages shared with a cloned file could not be located, and/or 5) use on non-routine computer operations that allow a lookup structure for a file system implementing hierarchical reference counting.

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc., which may be part of a on-premise, cloud-based, or hybrid storage solution.

A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes 130, 132, and/or 136, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage.

The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In some embodiments, the storage operating system may execute within a storage virtual machine, a hyperscaler, or other computing environment. The storage operating system may implement a storage file system to logically organize data within storage devices as one or more storage objects and provide a logical/virtual representation of how the storage objects are organized on the storage devices.

A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In some embodiments, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

Deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device.

Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an embodiment of background deduplication, data blocks that are duplicated between files are rearranged within storage units such that one copy of the data occupies physical storage. References to the single copy can be inserted into a file system structure such that all files or containers that contain the data refer to the same instance of the data.

Deduplication can be performed on a data storage device block basis. In an embodiment, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, and the like. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number.

For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other filesystem metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file.

The unique changelog entries are moved to the fingerprint database, which will serve as duplicate data for a next deduplication operation. In order to optimize certain file-system operations needed to deduplicate a block, duplicate records in the dup file are sorted in certain filesystem sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In some embodiments, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some aspects, a data transfer protocol, referred to as the LRSE (Logical Replication for Storage Efficiency) protocol, can be used as part of replicating consistency group differences from the first node 130 to the second node 132.

In the LRSE protocol, the second node 132 maintains a history buffer that keeps track of data blocks that the second node 132 has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an embodiment, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an embodiment, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be created by the first node 130 to comprise compressed data. The object is transmitted from the first node 130 to the distributed computing platform 102 for storage. In this way, the object within the distributed computing platform 102 maintains the data in a compressed state.

In an embodiment, various types of synchronization may be implemented by a synchronization module associated with the storage operating system. In an embodiment, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138 and/or between a node of a cluster and an instance of a node or virtual machine in the distributed computing platform 102.

As an example, during synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an embodiment, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SVMs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an embodiment, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an embodiment, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements (e.g., as discussed above), which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores 122-124. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
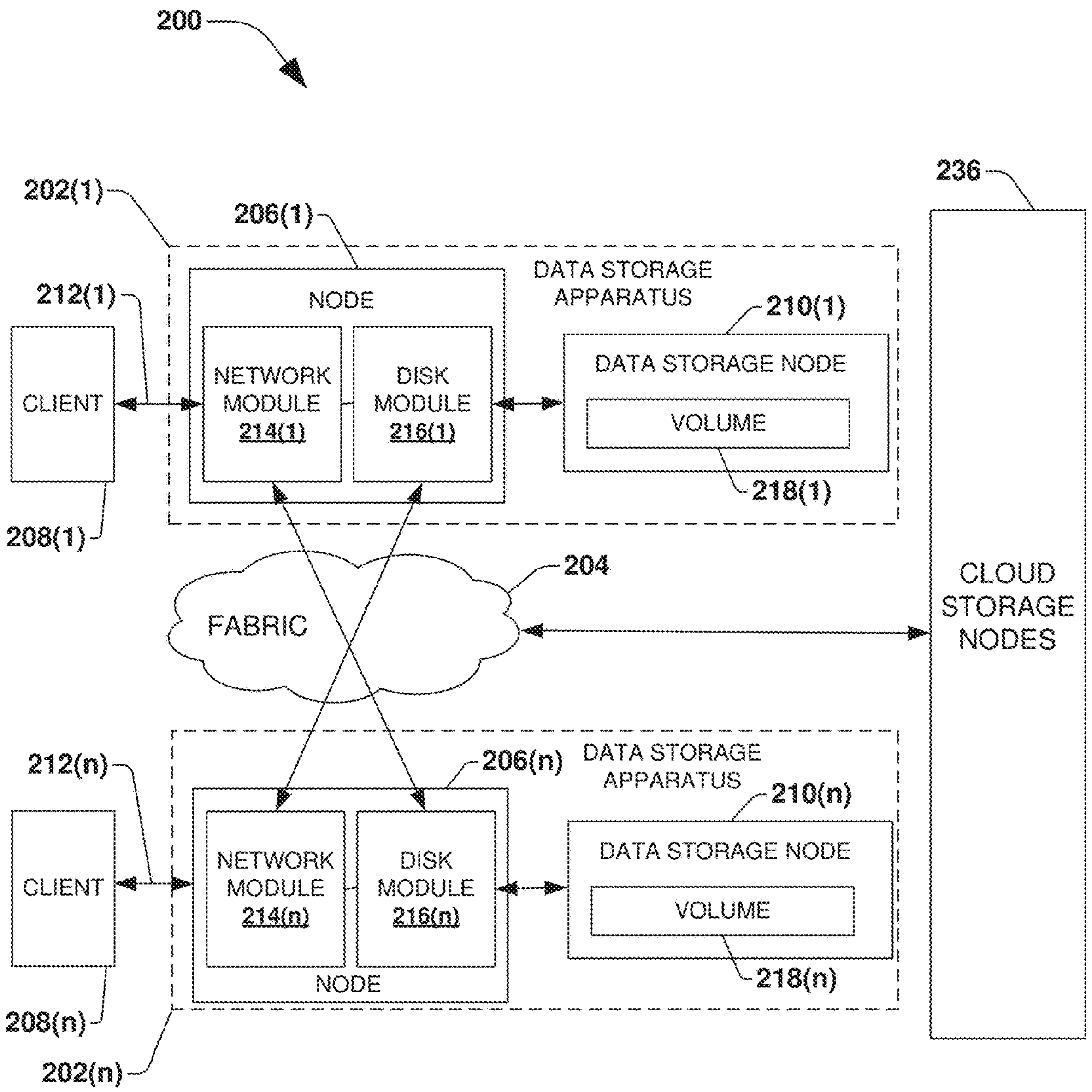
FIG. 2 is a block diagram illustrating an example of a network environment with exemplary nodes in accordance with an embodiment of the invention.

A clustered network environment 200 that may implement one or more aspects of the techniques described and illustrated herein is shown in FIG. 2. The clustered network environment 200 includes data storage apparatuses **202(1)-202(*n*) that are coupled over a cluster or cluster fabric 204 that includes one or more communication network(s) and facilitates communication between the data storage apparatuses 202(1)-202(*n*) (and one or more modules, components, etc. therein, such as, nodes 206(1)-206(*n*), for example), although any number of other elements or components can also be included in the clustered network environment 200** in other examples. This technology provides a number of advantages including methods, non-transitory computer readable media, and computing devices that implement the techniques described herein.

In this example, nodes **206(1)-206(*n*) can be primary or local storage controllers or secondary or remote storage controllers that provide client devices 208(1)-208(*n*) with access to data stored within data storage devices 210(1)-210(*n*) and cloud storage device(s) 236 (also referred to as cloud storage node(s)). The nodes 206(1)-206(*n*)** may be implemented as hardware, software (e.g., a storage virtual machine), or combination thereof.

The data storage apparatuses **202(1)-202(*n*) and/or nodes 206(1)-206(*n*) of the examples described and illustrated herein are not limited to any particular geographic areas and can be clustered locally and/or remotely via a cloud network, or not clustered in other examples. Thus, in one example the data storage apparatuses 202(1)-202(*n*) and/or node computing device 206(1)-206(*n*) can be distributed over a plurality of storage systems located in a plurality of geographic locations (e.g., located on-premise, located within a cloud computing environment, etc.); while in another example a clustered network can include data storage apparatuses 202(1)-202(*n*) and/or node computing device 206(1)-206(*n*)** residing in a same geographic location (e.g., in a single on-site rack).

In the illustrated example, one or more of the client devices **208(1)-208(*n*), which may be, for example, personal computers (PCs), computing devices used for storage (e.g., storage servers), or other computers or peripheral devices, are coupled to the respective data storage apparatuses 202(1)-202(*n*) by network connections 212(1)-212(*n*). Network connections 212(1)-212(*n*)** may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices **208(1)-208(*n*) may be general-purpose computers running applications and may interact with the data storage apparatuses 202(1)-202(*n*) using a client/server model for exchange of information. That is, the client devices 208(1)-208(*n*) may request data from the data storage apparatuses 202(1)-202(*n*) (e.g., data on one of the data storage devices 210(1)-210(*n*) managed by a network storage controller configured to process I/O commands issued by the client devices 208(1)-208(*n*)), and the data storage apparatuses 202(1)-202(*n*) may return results of the request to the client devices 208(1)-208(*n*) via the network connections 212(1)-212(*n*)**.

The nodes **206(1)-206(*n*) of the data storage apparatuses 202(1)-202(*n*) can include network or host nodes that are interconnected as a cluster to provide data storage and management services, such as to an enterprise having remote locations, cloud storage (e.g., a storage endpoint may be stored within cloud storage device(s) 236), etc., for example. Such nodes 206(1)-206(*n*) can be attached to the cluster fabric 204 at a connection point, redistribution point, or communication endpoint, for example. One or more of the nodes 206(1)-206(*n*)** may be capable of sending, receiving, and/or forwarding information over a network communications channel, and could comprise any type of device that meets any or all of these criteria.

In an embodiment, the nodes 206(1) and 206(*n*) may be configured according to a disaster recovery configuration whereby a surviving node provides switchover access to the data storage devices 210(1)-210(*n*) in the event a disaster occurs at a disaster storage site (e.g., the node computing device 206(1) provides client device 212(*n*) with switchover data access to data storage devices 210(*n*) in the event a disaster occurs at the second storage site). In other examples, the node computing device 206(*n*) can be configured according to an archival configuration and/or the nodes 206(1)-206(*n*) can be configured based on another type of replication arrangement (e.g., to facilitate load sharing). Additionally, while two nodes are illustrated in FIG. 2, any number of nodes or data storage apparatuses can be included in other examples in other types of configurations or arrangements.

As illustrated in the clustered network environment 200, nodes 206(1)-206(*n*) can include various functional components that coordinate to provide a distributed storage architecture. For example, the nodes 206(1)-206(*n*) can include network modules 214(1)-214(*n*) and disk modules 216(1)-216(*n*). Network modules 214(1)-214(*n*) can be configured to allow the nodes 206(1)-206(*n*) (e.g., network storage controllers) to connect with client devices 208(1)-208(*n*) over the storage network connections 212(1)-212(*n*), for example, allowing the client devices 208(1)-208(*n*) to access data stored in the clustered network environment 200.

Further, the network modules 214(1)-214(*n*) can provide connections with one or more other components through the cluster fabric 204. For example, the network module 214(1) of node computing device 206(1) can access the data storage device 210(*n*) by sending a request via the cluster fabric 204 through the disk module 216(*n*) of node computing device 206(*n*) when the node computing device 206(*n*) is available. Alternatively, when the node computing device 206(*n*) fails, the network module 214(1) of node computing device 206(1) can access the data storage device 210(*n*) directly via the cluster fabric 204. The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(*n*) can be configured to connect data storage devices 210(1)-210(*n*), such as disks or arrays of disks, SSDs, flash memory, or some other form of data storage, to the nodes 206(1)-206(*n*). Often, disk modules 216(1)-216(*n*) communicate with the data storage devices 210(1)-210(*n*) according to the SAN protocol, such as SCSI or FCP, for example, although other protocols can also be used. Thus, as seen from an operating system on nodes 206(1)-206(*n*), the data storage devices 210(1)-210(*n*) can appear as locally attached. In this manner, different nodes 206(1)-206(*n*), etc. may access data blocks, files, or objects through the operating system, rather than expressly requesting abstract files.

While the clustered network environment 200 illustrates an equal number of network modules 214(1)-214(*n*) and disk modules 216(1)-216(*n*), other examples may include a differing number of these modules. For example, there may be a plurality of network and disk modules interconnected in a cluster that do not have a one-to-one correspondence between the network and disk modules. That is, different nodes can have a different number of network and disk modules, and the same node computing device can have a different number of network modules than disk modules.

Further, one or more of the client devices 208(1)-208(*n*) can be networked with the nodes 206(1)-206(*n*) in the cluster, over the storage connections 212(1)-212(*n*). As an example, respective client devices 208(1)-208(*n*) that are networked to a cluster may request services (e.g., exchanging of information in the form of data packets) of nodes 206(1)-206(*n*) in the cluster, and the nodes 206(1)-206(*n*) can return results of the requested services to the client devices 208(1)-208(*n*). In one example, the client devices 208(1)-208(*n*) can exchange information with the network modules 214(1)-214(*n*) residing in the nodes 206(1)-206(*n*) (e.g., network hosts) in the data storage apparatuses 202(1)-202(*n*).

In one example, the storage apparatuses 202(1)-202(*n*) host aggregates corresponding to physical local and remote data storage devices, such as local flash or disk storage in the data storage devices 210(1)-210(*n*), for example. One or more of the data storage devices 210(1)-210(*n*) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(*n*) in this example, although any number of volumes can be included in the aggregates. The volumes 218(1)-218(*n*) are virtual data stores or storage objects that define an arrangement of storage and one or more filesystems within the clustered network environment 200. Volumes 218(1)-218(*n*) can span a portion of a disk or other storage device, a collection of disks, or portions of disks, for example, and typically define an overall logical arrangement of data storage. In one example, volumes 218(1)-218(*n*) can include stored user data as one or more files, blocks, or objects that may reside in a hierarchical directory structure within the volumes 218(1)-218(*n*).

Volumes 218(1)-218(*n*) are typically configured in formats that may be associated with particular storage systems, and respective volume formats typically comprise features that provide functionality to the volumes 218(1)-218(*n*), such as providing the ability for volumes 218(1)-218(*n*) to form clusters, among other functionality. Optionally, one or more of the volumes 218(1)-218(*n*) can be in composite aggregates and can extend between one or more of the data storage devices 210(1)-210(*n*) and one or more of the cloud storage device(s) 236 to provide tiered storage, for example, and other arrangements can also be used in other examples.

In one example, to facilitate access to data stored on the disks or other structures of the data storage devices 210(1)-210(*n*), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(*n*) (e.g., a Redundant Array of Independent (or Inexpensive) Disks (RAID system)) whose address, addressable space, location, etc. does not change. Typically, the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(*n*) can have one or more physical ports, wherein each physical port can be assigned a target address (e.g., SCSI target address). To represent respective volumes, a target address on the data storage devices 210(1)-210(*n*) can be used to identify one or more of the LUNs. Thus, for example, when one of the nodes 206(1)-206(*n*) connects to a volume, a connection between the one of the nodes 206(1)-206(*n*) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
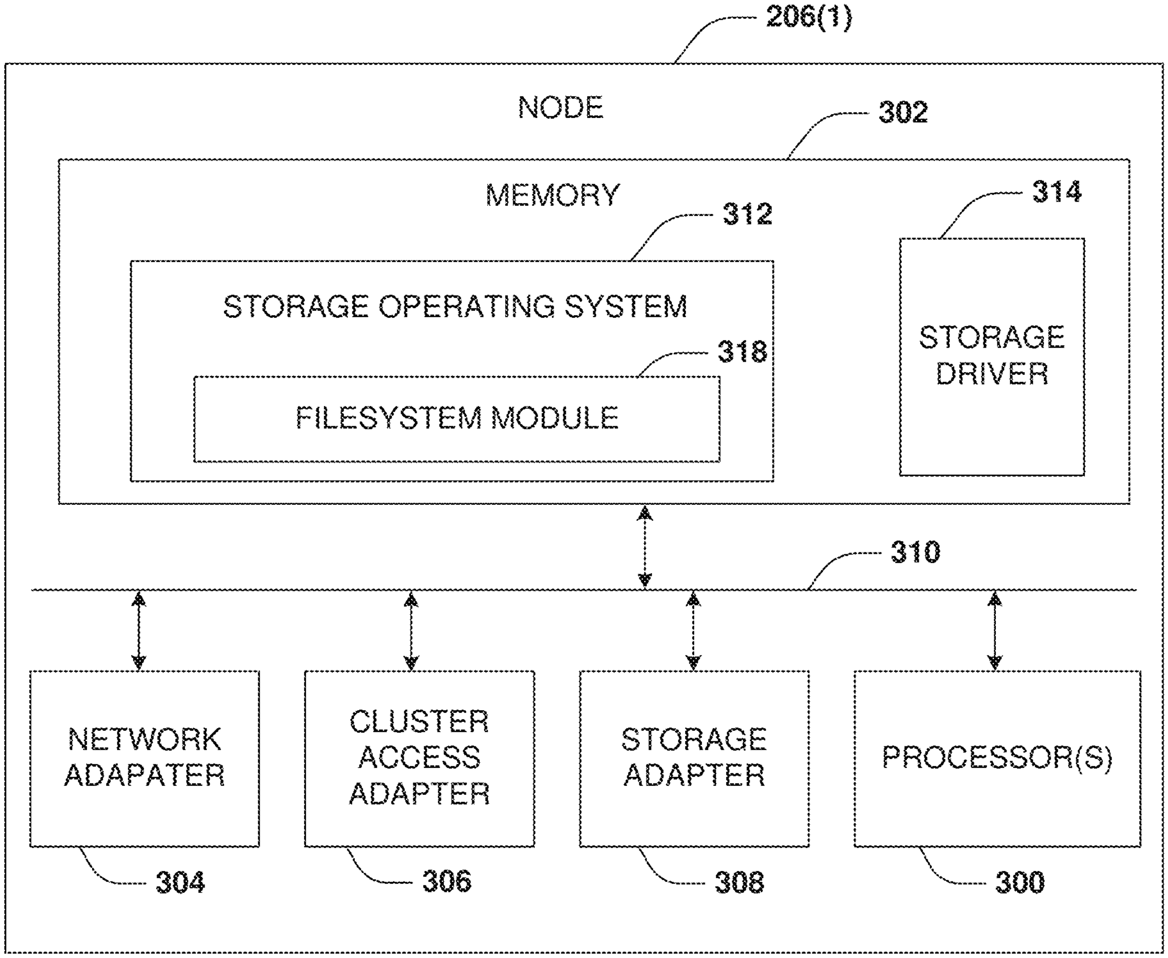
FIG. 3 is a block diagram illustrating an example of various components that may be present within a node that may be used in accordance with an embodiment of the invention.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(*n*) is substantially the same in structure and/or operation as node computing device 206(1), although the node computing device 206(*n*) can also include a different structure and/or operation in one or more aspects than the node computing device 206(1).

The network adapter 304 in this example includes the mechanical, electrical and signaling circuitry needed to connect the node computing device 206(1) to one or more of the client devices 208(1)-208(*n*) over network connections 212(1)-212(*n*), which may comprise, among other things, a point-to-point connection or a shared medium, such as a local area network. In some examples, the network adapter 304 further communicates (e.g., using TCP/IP) via the cluster fabric 204 and/or another network (e.g. a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(*n*) (e.g., to access data on a data storage device 210(1)-210(*n*) managed by a network storage controller). The information may be stored on any type of attached array of writeable media such as magnetic disk drives, flash memory, and/or any other similar media adapted to store information.

In the exemplary data storage devices 210(1)-210(*n*), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(2) and/or sent to another node computing device attached via the cluster fabric 204. In some examples, a storage driver 314 in the memory 302 interfaces with the storage adapter to facilitate interactions with the data storage devices 210(1)-210(*n*).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(*n*) or cloud storage device(s) 236 (e.g., or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein, as discussed above and further below.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4:
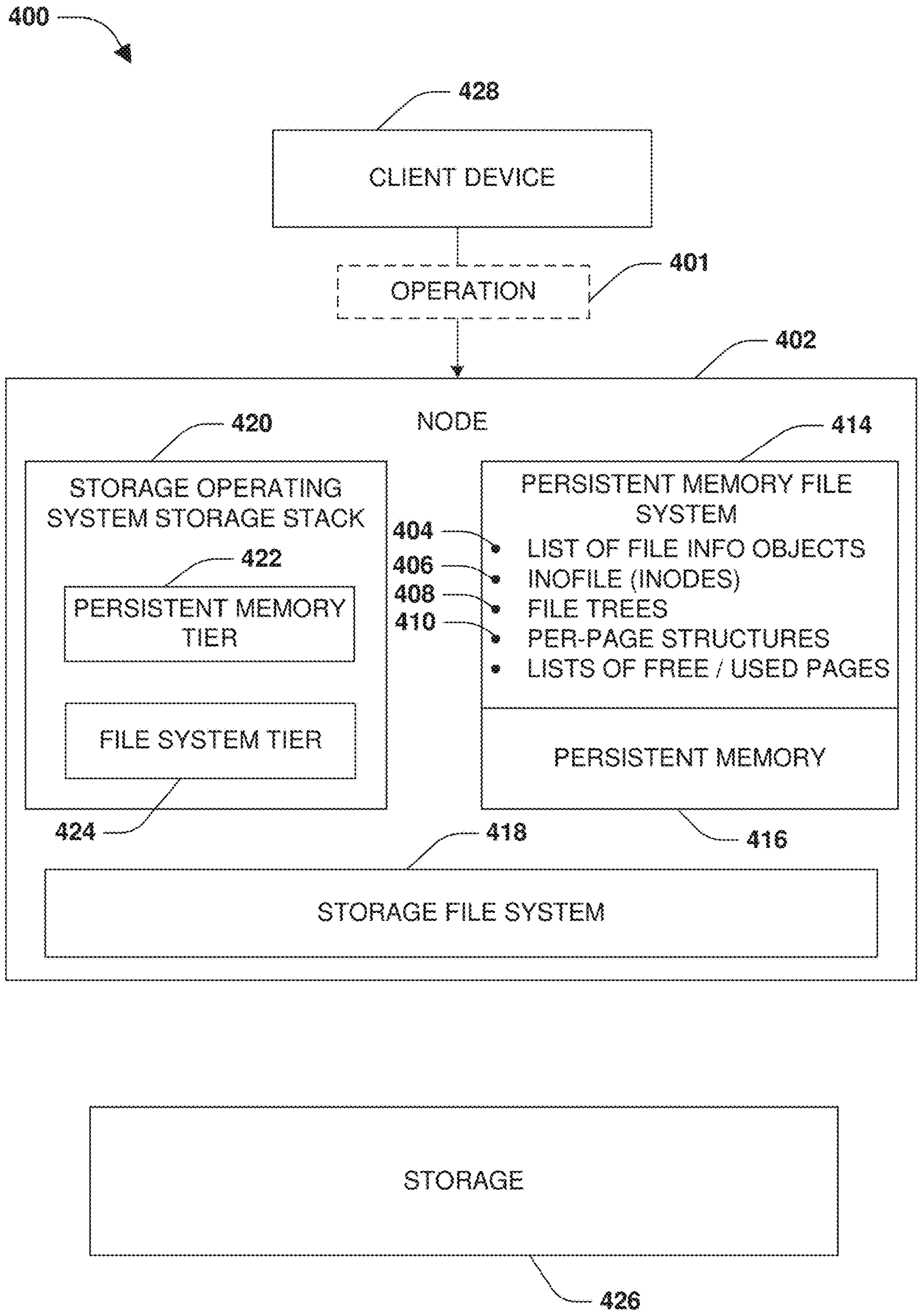
FIG. 4 is a block diagram illustrating an example of various components of system for implementing a persistent memory tier and a file system tier in accordance with an embodiment of the invention.

FIG. 4 illustrates a system 400 comprising node 402 that implements a file system tier 424 to manage storage 426 and a persistent memory tier 422 to manage persistent memory 416 of the node 402. The node 402 may comprise a server, an on-premise device, a virtual machine, computing resources of a cloud computing environment (e.g., a virtual machine hosted within the cloud), a computing device, hardware, software, or combination thereof. The node 402 may be configured to manage the storage and access of data on behalf of clients, such as a client device 428. The node 402 may host a storage operating system configured to store and manage data within and/or across various types of storage devices, such as locally attached storage, cloud storage, disk storage, flash storage, solid state drives, tape, hard disk drives, etc. For example, the storage operating system of the node 402 may store data within storage 426, which may be composed of one or more types of block-addressable storage (e.g., disk drive, a solid state drive, etc.) or other types of storage. The data may be stored within storage objects, such as volumes, containers, logical unit numbers (LUNs), aggregates, cloud storage objects, etc. In an embodiment, an aggregate or other storage object may be comprised of physical storage of a single storage device or storage of multiple storage devices or storage providers.

The storage operating system of the node 402 may implement a storage file system 418 that manages the storage and client access of data within the storage objects stored within the storage 426 associated with the node 402. For example, the client device 428 may utilize the storage file system 418 in order to create, delete, organize, modify, and/or access files within directories of a volume managed by the storage file system 418. The storage operating system may be associated with a storage operating system storage stack 420 that comprises a plurality of levels through which operations, such as read and write operations from client devices, are processed. An operation may first be processed by a highest level tier, and then down through lower level tiers of the storage operating system storage stack 420 until reaching a lowest level tier of the storage operating system storage stack 420. The storage file system 418 may be managed by a file system tier 424 within the storage operating system storage stack 420. When an operation reaches the file system tier 424, the operation may be processed by the storage file system 418 for storage within the storage 426.

The storage file system 418 may be configured with commands, APIs, data structures (e.g., data structures used to identify block address locations of data within the storage 426), and/or other functionality (e.g., functionality to access certain block ranges within the storage 426) that is tailored to the block-addressable storage 426. Because the storage file system 418 is tailored for the block-addressable semantics of the storage 426, the storage file system 418 may be unable to utilize other types of storage that use a different addressing semantics such as persistent memory 416 that is byte-addressable. The persistent memory 416 provides relatively lower latency and faster access speeds than the block-addressable storage 426 that the storage file system 418 is natively tailored to manage. Because the persistent memory 416 is byte-addressable instead of block-addressable, the storage file system 418, data structures of the storage file system 418 used to locate data according to block-addressable semantics of the storage 426, and the commands to store and retrieved data from the block-addressable storage 426 may not be able to be leveraged for the byte-addressable persistent memory 416.

Accordingly, a persistent memory file system 414 and the persistent memory tier 422 for managing the persistent memory file system 414 are implemented for the persistent memory 416 so that the node 402 can use the persistent memory file system 414 to access and manage the persistent memory 416 or other types of byte-addressable storage for storing user data. The persistent memory 416 may comprise memory that is persistent, such that data structures can be stored in a manner where the data structures can continue to be accessed using memory instructions and/or memory APIs even after the end of a process that created or last modified the data structures. The data structures and data will persist even in the event of a power loss, failure and reboot, etc.

The persistent memory 416 is non-volatile memory that has nearly the same speed and latency of DRAM and has the non-volatility of NAND flash. The persistent memory 416 could dramatically increase system performance of the node 402 compared to the higher latency and slower speeds of the block-addressable storage 426 accessible to the node 402 through the storage file system 418 using the file system tier 424 (e.g., hard disk drives, solid state storage, cloud storage, etc.). The persistent memory 416 is byte-addressable, and may be accessed through a memory controller. This provides faster and more fine-grained access to persistent storage within the persistent memory 416 compared to block-based access to the block-addressable storage 426 through the storage file system 418.

The persistent memory file system 414 implemented for the byte-addressable persistent memory 416 is different than the storage file system 418 implemented for the block-addressable storage 426. For example, the persistent memory file system 414 may comprise data structures and/or functionality tailored to byte-addressable semantics of the persistent memory 416 for accessing bytes of storage, which are different than data structures and functionality of the storage file system 418 that are tailored to block-addressable semantics of the storage 426 for accessing blocks of storage. Furthermore, the persistent memory file system 414 is tailored for the relatively faster access speeds and lower latency of the persistent memory 416, which improves the operation of the node 402 by allowing the node 402 to process I/O from client devices much faster using the persistent memory tier 422, the persistent memory file system 414, and the persistent memory 416.

In order to integrate the persistent memory 416 into the node 402 in a manner that allows client data of client devices, such as the client device 428, to be stored into and read from the persistent memory 416, the persistent memory tier 422 is implemented within the storage operating system storage stack 420 for managing the persistent memory 416. The persistent memory tier 422 is maintained at a higher level within the storage operating system storage stack 420 than the file system tier 424 used to manage the storage file system 418. The persistent memory tier 422 is maintained higher in the storage operating system storage stack 420 than the file system tier 424 so that operations received from client devices by the node 402 are processed by the persistent memory tier 422 before the file system tier 424 even though the operations may target the storage file system 418 managed by the file system tier 424. This occurs because higher levels within the storage operation system storage stack 420 process operations before lower levels within the storage operating system storage stack 420.

The persistent memory tier 422 may implement various APIs, functionality, data structures, metadata, and commands for the persistent memory file system 414 to access and/or manage the persistent memory 416. For example, the persistent memory tier 422 may implement APIs to access the persistent memory file system 414 of the persistent memory 416 for storing data into and/or retrieving data from the persistent memory 416 according to byte-addressable semantics of the persistent memory 416. The persistent memory tier 422 may implement functionality to determine when data should be tiered out from the persistent memory 416 to the storage 426 based upon the data becoming infrequently accessed, and thus cold.

The persistent memory file system 414 is configured with data structures and/or metadata for tracking and locating data within the persistent memory 416 according to the byte-addressable semantics. For example, the persistent memory file system 414 indexes the persistent memory 416 of the node 402 as an array of pages (e.g., 4 kb pages) indexed by page block numbers. One of the pages, such as a page (1), comprises a file system superblock that is a root of a file system tree (a buffer tree) of the persistent memory file system 414. A duplicate copy of the file system superblock may be maintained within another page of the persistent memory 416 (e.g., a last page, a second to last page, a page that is a threshold number of indexed pages away from page (1), etc.). The file system superblock comprises a location of a list of file system info objects 404.

The list of file system info objects 404 comprises a linked list of pages, where each page contains a set of file system info objects. If there are more file system info objects than what can be stored within a page, then additional pages may be used to store the remaining file system info objects and each page will have a location of the next page of file system info objects. In this way, a plurality of file system info objects can be stored within a page of the persistent memory 416. Each file system info object defines a file system instance for a volume and snapshot (e.g., a first file system info object correspond to an active file system of the volume, a second file system info object may correspond to a first snapshot of the volume, a third file system info object may correspond to a second snapshot of the volume, etc.). Each file system info object comprises a location within the persistent memory 416 of an inofile (e.g., a root of a page tree of the inofile) comprising inodes of a file system instance.

An inofile 406 of the file system instance comprises an inode for each file within the file system instance. An inode of a file comprises metadata about the file. Each inode stores a location of a root of a file tree for a given file. In particular, the persistent memory file system 414 maintains file trees 408, where each file is represented by a file tree of indirect pages (intermediate nodes of the file tree) and direct blocks (leaf nodes of the file tree). The direct blocks are located in a bottom level of the file tree, and one or more levels of indirect pages are located above the bottom level of the file tree. The indirect pages of a particular level comprise references to blocks in a next level down within the file tree (e.g., a reference comprising a page block number of a next level down node or a reference comprising a per-page structure ID of a per-page structure having the page block number of the next level down node). Direct blocks are located at a lowest level in the file tree and comprise user data. Thus, a file tree for a file may be traversed by the persistent memory file system 414 using a byte range (e.g., a byte range specified by an I/O operation) mapped to a page index of a page (e.g., a 4k offset) comprising the data within the file to be accessed.

The persistent memory file system 414 may maintain other data structures and/or metadata used to track and locate data within the persistent memory 416. In an embodiment, the persistent memory file system 414 maintains per-page structures 410. A per-page structure is used to track metadata about each page within the persistent memory 416. Each page will correspond to a single per-page structure that comprises metadata about the page. In an embodiment, the per-page structures are stored in an array within the persistent memory 416. The per-page structures correspond to file system superblock pages, file system info pages, indirect pages of the inofile 406, user data pages within the file trees 408, per-page structure array pages, etc.

In an embodiment of implementing per-page structure to page mappings using a one-to-one mapping, a per-page structure for a page can be fixed at a page block number offset within a per-page structure table. In an embodiment of implementing per-page structure to page mappings using a variable mapping, a per-page structure of a page stores a page block number of the page represented by the per-page structure. With the variable mapping, persistent memory objects (e.g., objects stored within the file system superblock to point to the list of file system info objects; objects within a file system info object to point to the root of the inofile; objects within an inode to point to a root of a file tree of a file; and objects within indirect pages to point to child blocks (child pages)) will store a per-page structure ID of its per-page structure as a location of a child page being pointed to, and will redirect through the per-page structure using the per-page structure ID to identify the physical block number of the child page being pointed to. Thus, an indirect entry of an indirect page will comprise a per-page structure ID that can be used to identify a per-page structure having a physical block number of the page child pointed to by the indirect page.

The persistent memory tier 422 may implement functionality to utilize a policy to determine whether certain operations should be redirected to the persistent memory file system 414 and the persistent memory 416 or to the storage file system 418 and the storage 426 (e.g., if a write operation targets a file that the policy predicts will be accessed again, such as accessed within a threshold timespan or accessed above a certain frequency, then the write operation will be retargeted to the persistent memory 416). For example, the node 402 may receive an operation from the client device 428.

The operation may be processed by the storage operating system using the storage operating system storage stack 420 from a highest level down through lower levels of the storage operating system storage stack 420. Because the persistent memory tier 422 is at a higher level within the storage operating system storage stack 420 than the file system tier 424, the operation is intercepted by the persistent memory tier 422 before reaching the file system tier 424. The operation is intercepted by the persistent memory tier 422 before reaching the file system tier 424 even though the operation may target the storage file system 418 managed by the file system tier 424. This is because the persistent memory tier 422 is higher in the storage operating system storage stack 420 than the file system tier 424, and operations are processed by higher levels before lower levels within the storage operating system storage stack 420.

Accordingly, the operation is intercepted by the persistent memory tier 422 within the storage operating system storage stack 420. The persistent memory tier 422 may determine whether the operation is to be retargeted to the persistent memory file system 414 and the persistent memory 416 or whether the operation is to be transmitted (e.g., released to lower tiers within the storage operating system storage stack 420) by the persistent memory tier 422 to the file system tier 424 for processing by the storage file system 418 utilizing the storage 426. In this way, the tiers within the storage operating system storage stack 420 are used to determine how to route and process operations utilizing the persistent memory 416 and/or the storage 426.

In an embodiment, an operation 401 is received by the node 402. The operation 401 may comprise a file identifier of a file to be accessed. The operation 401 may comprise file system instance information, such as a volume identifier of a volume to be accessed and/or a snapshot identifier of a snapshot of the volume to be accessed. If an active file system of the volume is to be accessed, then the snapshot identifier may be empty, null, missing, comprising a zero value, or otherwise comprising an indicator that no snapshot is to be accessed. The operation 401 may comprise a byte range of the file to be accessed.

The list of file system info objects 404 is evaluated using the file system information to identify a file system info object matching the file system instance information. That is, the file system info object may correspond to an instance of the volume (e.g., the active file system of the volume or a snapshot identified by the snapshot identifier of the volume identified by the volume identifier within the operation 401) being targeted by the operation 401, which is referred to as an instance of a file system or a file system instance. In an embodiment of the list of file system info objects 404, the list of file system info objects 404 is maintained as a linked list of entries. Each entry corresponds to a file system info object, and comprises a volume identifier and a snapshot identifier of the file system info object. In response to the list of file system info objects 404 not comprising any file system info objects that match the file system instance information, the operation 401 is routed to the file system tier 424 for execution by the storage file system 418 upon the block-addressable storage 426 because the file system instance is not tiered into the persistent memory 416. However, if the file system info object matching the file system instance information is found, then the file system info object is evaluated to identify an inofile such as the inofile 406 as comprising inodes representing files of the file system instance targeted by the operation 401.

The inofile 406 is traversed to identify an inode matching the file identifier specified by the operation 401. The inofile 406 may be represented as a page tree having levels of indirect pages (intermediate nodes of the page tree) pointing to blocks within lower levels (e.g., a root points to level 2 indirect pages, the level 2 indirect pages point to level 1 indirect pages, and the level 1 indirect pages point to level 0 direct blocks). The page tree has a bottom level (level 0) of direct blocks (leaf nodes of the page tree) corresponding to the inodes of the file. In this way, the indirect pages within the inofile 406 are traversed down until a direct block corresponding to an inode having the file identifier of the file targeted by the operation 401 is located.

The inode may be utilized by the persistent memory file system 414 to facilitate execution of the operation 401 by the persistent memory tier 422 upon the persistent memory 416 in response to the inode comprising an indicator (e.g., a flag, a bit, etc.) specifying that the file is tiered into the persistent memory 416 of the node 402. If the indicator specifies that the file is not tiered into the persistent memory 416 of the node 402, then the operation 401 is routed to the file system tier 424 for execution by the storage file system 418 upon the block-addressable storage 426.

In an embodiment where the operation 401 is a read operation and the inode comprises an indicator that the file is tiered into the persistent memory 416, the inode is evaluated to identify a pointer to a file tree of the file. The file tree may comprise indirect pages (intermediate nodes of the file tree comprising references to lower nodes within the file tree) and direct blocks (leaf nodes of the file tree comprising user data of the file). The file tree may be traversed down through levels of the indirect pages to a bottom level of direct blocks in order to locate one or more direct blocks corresponding to pages within the persistent memory 416 comprising data to be read by the read operation (e.g., a direct block corresponding to the byte range specified by the operation 401). That is, the file tree may be traversed to identify data within one or more pages of the persistent memory 416 targeted by the read operation. The traversal utilizes the byte range specified by the read operation. The byte range is mapped to a page index of a page (e.g., a 4 kb offset) of the data within the file to be accessed by the read operation. In an embodiment, the file tree is traversed to determine whether the byte range is present within the persistent memory 416. If the byte range is present, then the read operation is executed upon the byte range. If the byte range is not present, then the read operation is routed to the file system tier 424 for execution by the storage file system 418 upon the block-based storage 426 because the byte range to be read is not stored within the persistent memory 416. If a portion of the byte range is present within the persistent memory 416, then the remaining portion of the byte range is retrieved from the storage 426.

In an embodiment where the operation 401 is a write operation, access pattern history of the file (e.g., how frequently and recently the file has been accessed) is evaluated in order to determine whether the execute the write operation upon the persistent memory 416 or to route the write operation to the file system tier 424 for execution by the storage file system 418 upon the block-addressable storage 426. In this way, operations are selectively redirected by the persistent memory tier 422 to the persistent memory file system 414 for execution upon the byte-addressable persistent memory 416 or routed to the file system tier 424 for execution by the storage file system 418 upon the block-addressable storage 426 based upon the access pattern history (e.g., write operations targeting more frequently or recently accessed data/files may be executed against the persistent memory 416).

Local reference counts, such as a hierarchy of local reference counts where child pages inherit reference counts of parent pages, may be maintained for pages within the persistent memory file system 414. A local reference count of a page within the persistent memory file system 414 indicates how many times data within the page is referenced by an active file system and/or by one or more snapshots and file clones. When a write operation targeting a page is executed, the write operation may be executed to directly write data to the page or is executed as a copy-on-write operation where the page is copied as a copied page and the data is written to the copied page. That is, if the reference count is 1, then merely a single entity (e.g., the active file system, a snapshot, a file clone, etc.) is referencing the page, and thus the write operation can be directed executed upon the page. However, if the reference count is greater than 1, then more than one entity is referencing the page, and thus a copy-on-write operation is performed so that the write operation can be executed upon a copied page of the page. This preserves the original data of the page that is still referenced by other entities.

If a local reference count of a page is incorrect because it inherits a reference count from a parent page that has a different value than the local reference count (e.g., a snapshot operation may merely increment a reference count of a file system info object instead of all pages below the file system info object within a file system tree), then various issues can occur. For example, if the local reference count is 1 but the page inherits a reference count of 2 because both an active file system and a snapshot reference the page, then a write operation may be directly executed upon the page to overwrite data of the page. Now, the snapshot will reference this new data as opposed to the original data that the snapshot should reference, and thus the snapshot comprises incorrect data. In this way, determining a correct reference count for a page is important, and thus a full traversal of the file system tree would need to be performed to count references to the page.

Figure 5:
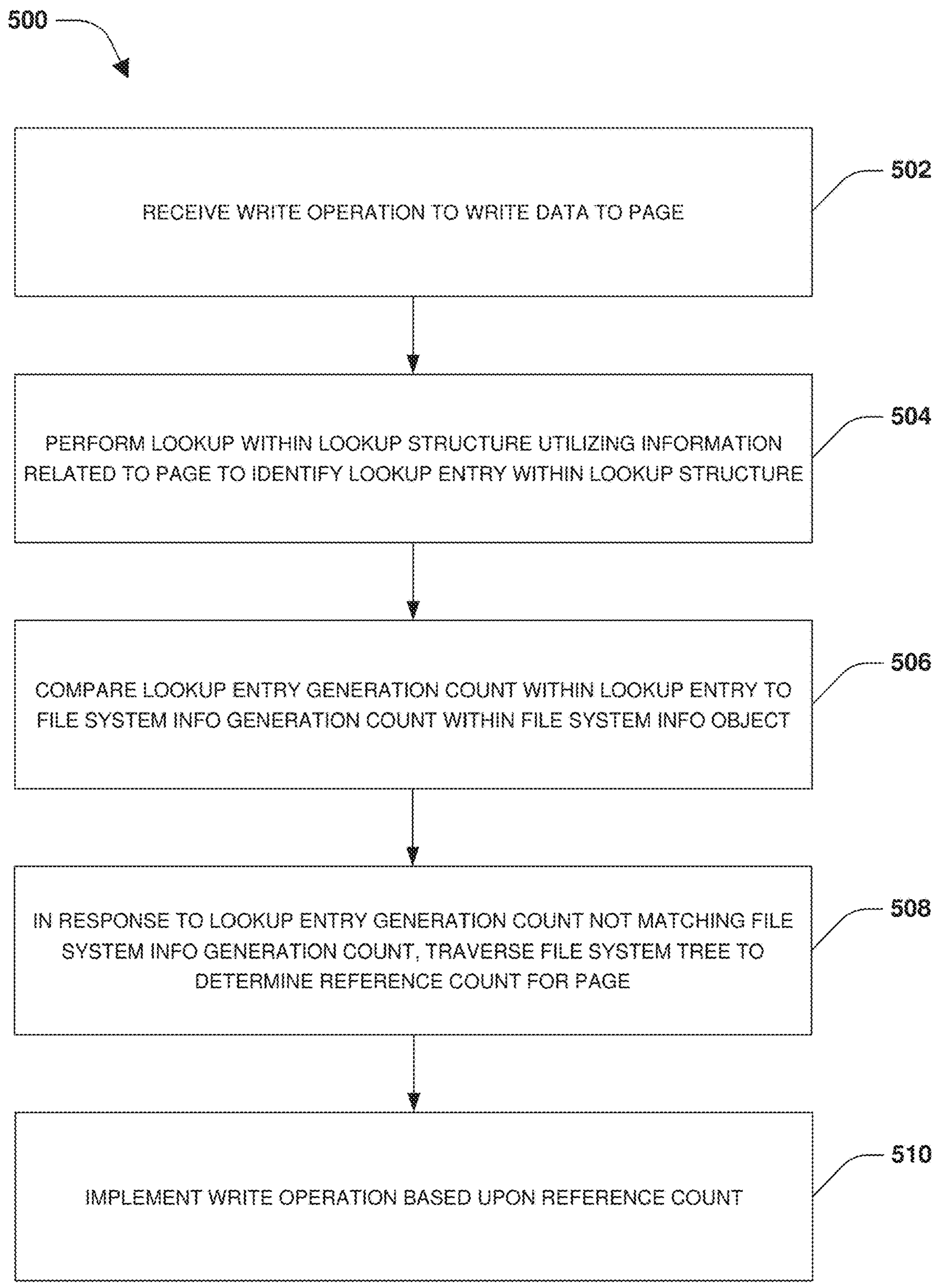
FIG. 5 is a flow chart illustrating an example of a set of operations that support a lookup structure for a file system implementing hierarchical reference counting in accordance with an embodiment of the invention.
Figure 8:
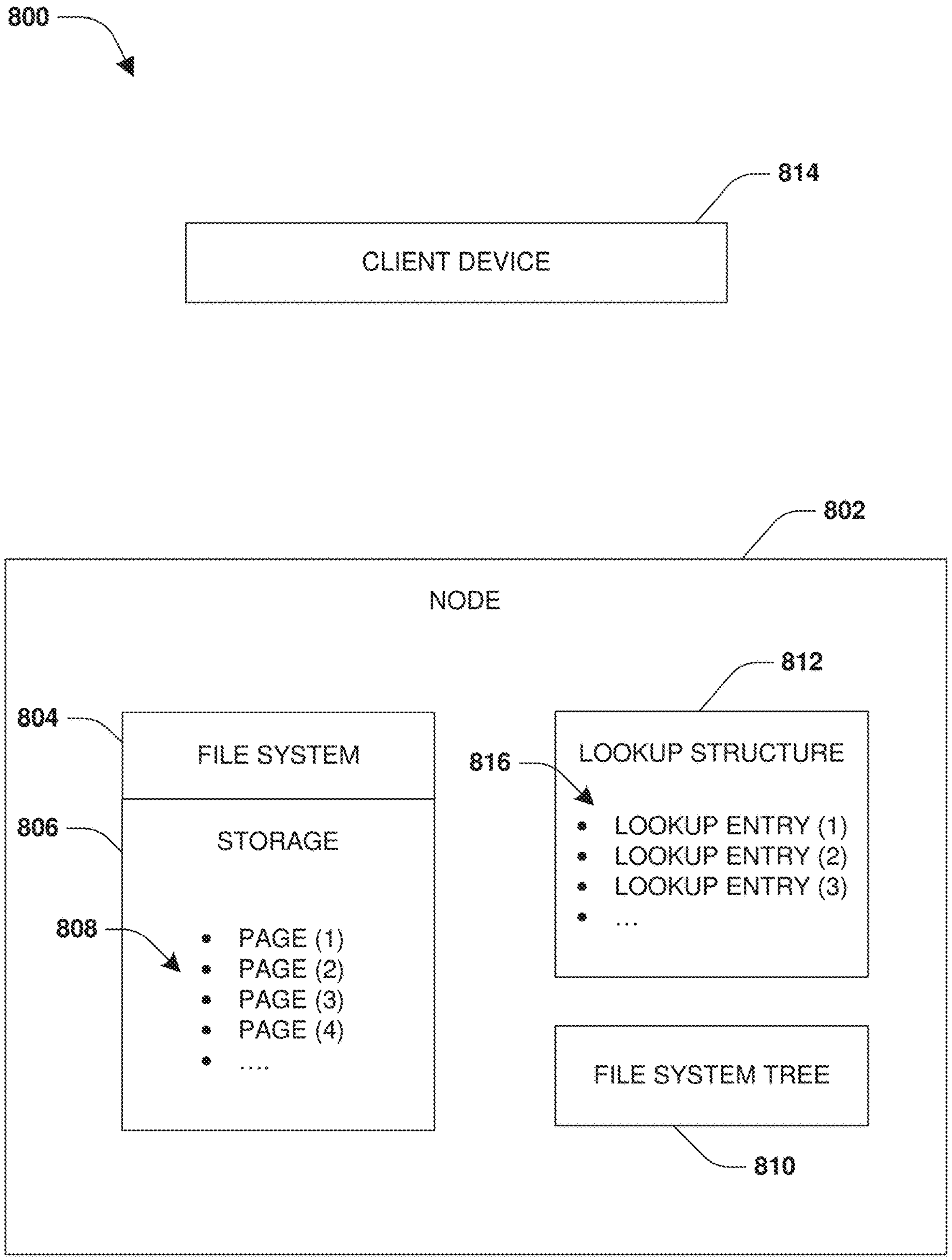
FIG. 8 is a block diagram illustrating an example of supporting a lookup structure for a file system implementing hierarchical reference counting in accordance with an embodiment of the invention.

One embodiment of supporting a lookup structure for a file system implementing hierarchical reference counting is illustrated by an exemplary method 500 of FIG. 5 and further described in conjunction with system 800 of FIG. 8. A node 802, such as a computing device, a server, a virtual machine, hardware, software, or combination thereof, may implement a file system 804 used to store and organize data within storage 806, such as persistent memory, various types of random-access memory, storage devices, etc. The file system 804 may implement an active file system through which client devices can actively store and access data within the pages 808 of the storage 806, such as through read and write operations received by the node 802 over a network from a client device 814.

The file system 804 may store data within pages 808 of the storage 806 (e.g., a persistent memory file system may store data within pages of a persistent memory). The file system 804 may utilize a file system tree 810 to organize the pages 808 within the storage 806. The file system tree 810 may comprise a root node such as a file system superblock, inofiles associated with inodes of files (e.g., root nodes of file trees for files), file trees comprises indirect pages (indirect nodes) and direct pages (leaf nodes) comprising user data of files, and/or other information. The file system tree 810 may be traversed down from the root node to a target page (e.g., a page that is to be read, written to, or modified) in order to access the target page.

Traversing the file system tree 810 may be relatively time consuming and resource intensive, which increases the latency of operations being executed by the file system 804 upon the pages 808 in the storage 806. Accordingly, the node 802 may implement a lookup structure 812 (e.g., a buffer hash, a lookup table, any other structure) with lookup entries 816 for the pages 808 within the storage 806. A lookup entry for a page may be indexed within the lookup structure 812 in various manners, such as based upon a hash of information associated with the page. The information may comprise a file system identifier (or hash identifier), a level of the page within the file system tree 810 (e.g., user data will be stored within direct pages located within a level 0 of the file system tree 810, while indirect pages may be located within a level 1 and/or other levels of the file system tree 810), and/or a file block number of the page. The lookup entry comprises information used to access the physical location of the page within the storage 806 (e.g., a physical block number at which the page is stored), such as a pointer to the physical location or a per-page structure ID of a per-page structure that can be used to identify the physical location of the page. In this way, the page may be quickly located within the storage 806 using the lookup entry within the lookup structure 812, as opposed to traversing the file system tree 810, which can take substantially more time and increase latency when processing operations targeting the pages 808 within the storage 806.

The file system 804 may implement hierarchical referencing counting for the pages 808 within the storage 806. A local reference count may be maintained for each page within the storage 806. However, a local reference count of a page may or may not reflect the actual/correct reference count of the page. This is because pages inherit reference counts of any parent pages within the file system tree 810 (e.g., pages along a path down through the file system tree 810 to the page). For example, a level 0 direct page comprising user data may maintain a local reference count, such as 1. The level 0 direct page may be a child of a level 1 indirect page, which may be a child of another page within the file system tree 810. If the level 1 indirect page (or any other parent page within the file system tree 810) has a reference count of 2, then the level 0 direct page will inherit that reference count of 2, and thus the local reference count of 1 is not an accurate reflection of the actual/correct reference count of the level 0 direct page.

In order to determine the actual/correct reference count of the level 0 direct page, then the file system tree 810 must be traversed to identify the actual/correct reference count. However, if the lookup structure 812 is used to skip the file system tree 810 traversal and directly access the level 0 direct page, then the incorrect reference count of 1 from the local reference count would be used. If the level 0 direct page has an actual reference count greater than 1, such as the inherited reference count of 2, then the level 0 direct page cannot be directly written to. Instead, a copy-on-write operation is to be performed to copy the level 0 direct page and write to that copy in order to preserve the original data within the level 0 direct page. However, if the file system tree 810 traversal is skipped and the local reference count of 1 is used, then the level 0 direct page would be directly written to, and the other entity (e.g., the active file system, a snapshot, etc.) referencing the original data will now reference the new data, which causes data corruption and lost data.

Accordingly, as provided herein, lookup entry generation counts of pages and a file system info generation count of a file system info object are created and tracked. These generation counts can be used so that the lookup structure 812 can be utilized with hierarchical referencing counting provided by the file system 804 in a manner that ensures that the wrong reference counts are not used. In some embodiments, snapshot operations and file clone operations can cause a local reference count of a page to become inaccurate because such operations may skip modifying the local reference count of the page, and may merely modify a parent reference count (e.g., a snapshot operation merely modifies a file system info generation count or a file clone operation merely modifies a reference count of an inode of a file that is cloned). For example, a snapshot of a volume of the file system 804 is created. When the snapshot is created, pending I/O operations on the volume are completed (e.g., in-flight I/O operations are drained). As part of creating the snapshot, the file system info generation count is incremented, but not local reference counts of pages within the volume. This ensures that nothing is modifying data of the volume while the snapshot is being created. This also ensures that when a file system info generation count is incremented, no other entity already has a reference to a page within the storage 806. In another example, when a file clone is created, a file generation count for the file is incremented, but not local reference counts of pages within the file. In these examples, a parent page can have a reference count different than a child page due to how snapshot operations and file clone operations skip modifying local reference counts of pages. Thus, a local reference count of the child page may be incorrect because the child page inherits the reference count of the parent page.

The lookup entry generation counts and the file system info generation count can be used to determine how to process read and write operations. These generation counts can be used to determine whether a lookup entry for a page targeted by an operation is safe to use for directly accessing the page because the local reference count of the page is accurate. Otherwise, a file system tree 810 traversal is performed in order to identify the accurate/correct reference count because the local reference count could possibly be incorrect.

During operation 502 of method 500 of FIG. 5, a write operation to write data to a page maintained by the file system 804 is received by the node 802. For example, the client device 814 may transmit the write operation to the node 802 in order to write data to the page. Information associated with the page may be determined, such as based upon the write operation and/or metadata associated with the page. If the page corresponds to an inofile block, then the information may comprise a file system identifier, a level of the page within the file system tree 810, and/or a file block number of the page. If the page corresponds to a user file, then the information may comprise a hash identifier of the file/inode, a level of the page within the file system tree 810, and/or file block number of the page.

During operation 504 of method 500 of FIG. 5, a lookup within the lookup structure 812 is performed utilizing the information associated with the page in order to identify a lookup entry within the lookup structure 812 that is associated with the page. If the page is the inofile block, then the lookup is performed utilizing a hash of the file system identifier, the level, and/or the file block number. If the page is the user file, then the lookup is performed utilizing a hash of the hash identifier, the level, and/or the file block number. The lookup entry may comprise a lookup entry generation count. In some embodiments, the lookup entry generation count may correspond to the generation count of the file system info at time of insertion of the page into the storage 806. For example, a page that is referenced by the active file system and/or one or more snapshots may be cached from other storage into the storage 806 (e.g., the page may be cached from disk storage into persistent memory), and thus the lookup entry is inserted into the lookup structure 812 with a lookup entry generation count corresponding to the file system info's generation count page at the time of caching.

During operation 506 of method 500 of FIG. 5, the lookup entry generation count is compared with the file system info generation count within the file system info object for the volume associated with the page. The lookup entry generation count corresponds the generation count of the file system info at time of insertion, while the file system info generation count corresponds to the active file system and/or any snapshots of the volume referencing pages within the file system tree 810 (e.g., snapshots of the volume that are created after the insertion). If the lookup entry generation count matches the file system info generation count, then the local reference count of the page is accurate. That is, no additional snapshots have been subsequently made, which would otherwise only increment the file system info generation count and not update the local reference count, and thus the local reference count would be inaccurate because the snapshots would additional reference the page, which is not reflected by the local reference count. Accordingly, traversing the file system tree 810 to determine the reference count for the page can be bypassed when the generation counts match, thus improving the performance of executing the write operation. Instead of performing the traversal, information within the lookup entry for the page can be used to access the page, and the page can be processed based upon the local reference count. If the local reference count is equal to 1, then the write operation can be directly executed upon the page to write the data to the page. If the local reference count is greater than the 1, then a copy-on-write operation is performed. The copy-on-write operation copies the page to create a copied page. The write operation is then performed upon the copied page, thus preserving the original data of the page.

During operation 508 of method 500 of FIG. 5, if the lookup entry generation count does not match the file system info generation count, then the file system tree 810 is traversed to determine a reference count for the page. That is, if the lookup entry generation count does not match the file system info generation count, then the local reference count of the page could be inaccurate (e.g., a snapshot could have been created by a snapshot operation that merely updated the file system info generation count as opposed to local reference counts of pages captured by the snapshot). Accordingly, the file system tree 810 is traversed to count references to the page in order to identify the actual/correct reference count. If the lookup entry generation count matches the file system info generation count, then traversal of the file system tree 810 is bypassed and the lookup entry is utilized to access the page.

During operation 510 of method 500 of FIG. 5, the write operation is implemented based upon the reference count. In particular, if the reference count is greater than 1, then a copy-on-write operation is performed. The copy-on-write operation copies the page to create a copied page. The write operation is then performed upon the copied page, thus preserving the original data of the page. If the reference count is equal to 1, then the write operation can be directly executed upon the page to write the data to the page.

In some embodiments, a read operation targeting a page within the storage 806 is received by the node 802. A lookup within the lookup structure 812 is performed using information associated with the page in order to identify a lookup entry associated with the page. If a lookup entry generation count within the lookup entry is less than or equal to the file system info generation count, then the lookup entry is used for executing the read operation to read data from the page.

The node 802 may process other operations directed to the file system 804 and the pages 808 within the storage 806. In some embodiments, a snapshot delete operation may be performed to delete a snapshot of the volume. As part of performing the snapshot delete operation, a file system info object associated with the snapshot is removed, and thus there is no longer any file system info object comprising a generation count associated with the snapshot. In some embodiments, a snapshot restore operation is received to restore the active file system to a state captured within a snapshot. As part of the snapshot restore operation, the lookup structure 812 is traversed to invalidate lookup entries that have entry generation counts greater than a file system info generation count of the snapshot.

Figure 6:
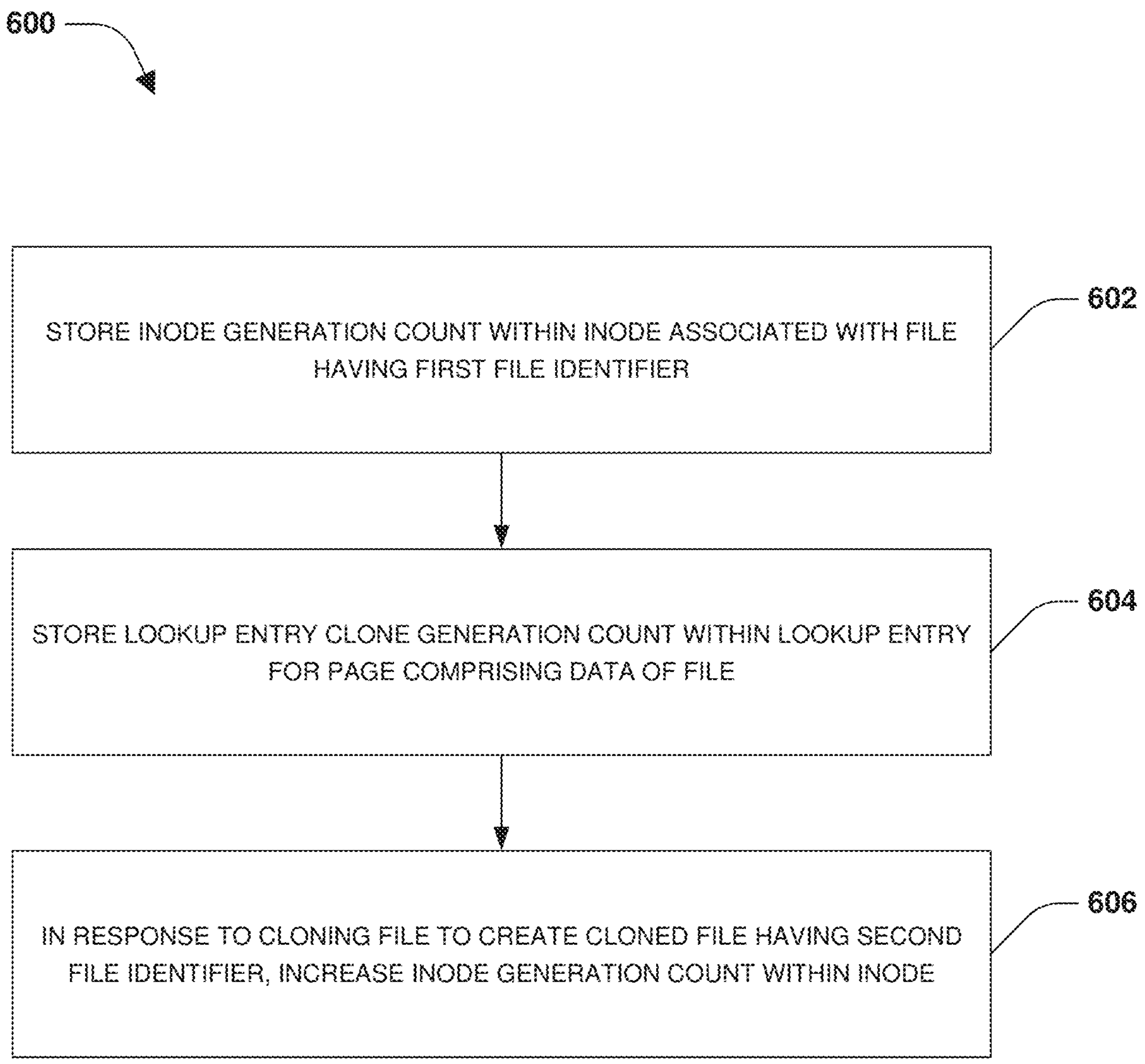
FIG. 6 is a flow chart illustrating an example of a set of operations that support a lookup structure for a file system implementing hierarchical reference counting in accordance with an embodiment of the invention.

One embodiment of supporting a lookup structure for a file system implementing hierarchical reference counting is illustrated by an exemplary method 600 of FIG. 6 and further described in conjunction with system 800 of FIG. 8. A file clone operation may be performed to replicate a file to create a cloned file. The cloned file may initially reference the same pages as the file. Instead of updating local reference counts of all those pages, the file clone operation may merely increase the reference count at the inode level and increment an inode generation count within an inode associated with the file/cloned file, which improves the performance of executing the file clone operation. However, now the local reference counts of those pages are inaccurate. Accordingly, the techniques provided herein, are capable of ensuring incorrect local reference counts are not utilized.

During operation 602 of method 600 of FIG. 6, an inode generation count is stored within an inode associated with a file having a first file identifier. The inode may also comprise an inode reference count corresponding to a number of times the file is referenced by an active file system and/or file clones of the file. For example, when a file clone of the file is created, then the inode reference count is incremented to indicate that the file clone now references the pages of the file, as opposed to having to increment local reference counts of the pages of the file. This can be done because the pages will inherit the reference counts of parent pages within the file system tree 810 because the file system 804 implements hierarchical referencing counting.

During operation 604 of method 600 of FIG. 6, a lookup entry clone generation count may be stored within a lookup entry, associated a page, within the lookup structure 812. The page may comprise data of the file having the first file identifier. In some embodiments, the lookup entry may be indexed within the lookup structure 812 based up a hash of the first file identifier. The lookup entry clone generation count may be set with a value of the inode generation count when the lookup entry of the page is inserted into the lookup structure 812, and is not modified thereafter. Thus, when the lookup entry is inserted into the lookup structure 812, the lookup entry clone generation count will have the same value as the inode generation count within the inode for the file.

During operation 606 of method 600 of FIG. 6, in response to the file being cloned to create a cloned file having a second file identifier, the inode generation count within the inode is increased. The inode generation count is increased to indicate that the cloned file was created and initially references the pages of the file. Local reference counts of the files' pages may be inaccurate because the cloning of the file may not update the local reference counts. That is, the cloning of the file does not increase the lookup entry clone generation counts of the pages storing data of the file. Accordingly, if the lookup entry clone generation count does not match the inode generation count, then the lookup entry for the page should not be used to directly access the page within the storage 806 for performing a write operation upon the page because the local reference count of the page may be incorrect. Thus, the file system tree 810 is traversed in order to identify the accurate/correct reference count for processing the write operation.

However, if the lookup entry clone generation count matches the inode generation count, then the lookup entry may be used to directly access the page for executing the write operation. If a read operation targeting the page is received, then the first file identifier is utilized to locate the lookup entry within the lookup structure 812 for accessing the page for reading. In particular, if a read operation was received in a context of a parent file, then a file identifier of a corresponding file can be used for the lookup. If the read operation was received in the context of a clone file, then the file identifier is not used. The lookup will utilize the file identifier of whichever file is being accessed. A read through the clone file will miss in the lookup structure 812 using the second file identifier.

Figure 7:
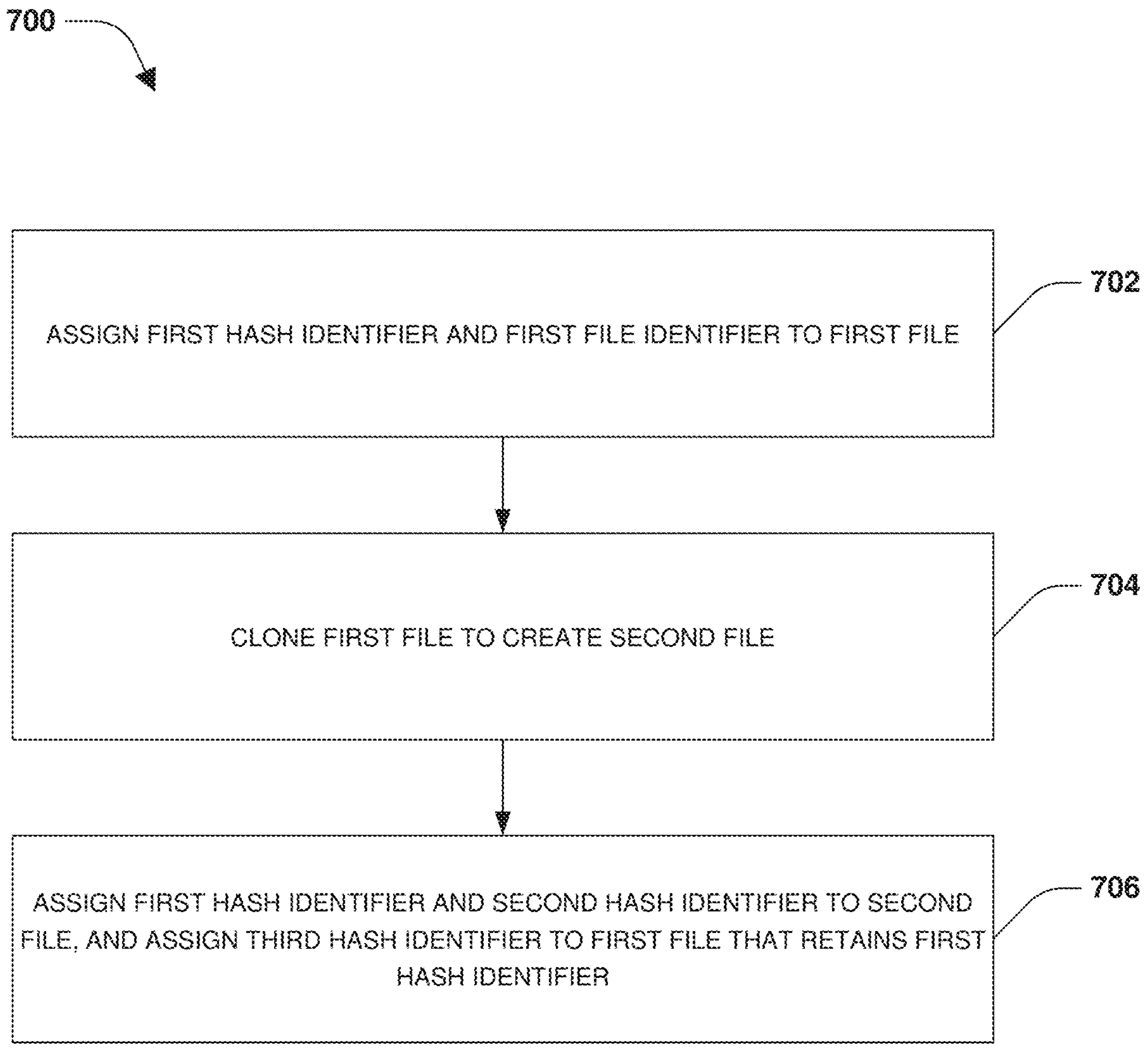
FIG. 7 is a flow chart illustrating an example of a set of operations that support a lookup structure for a file system implementing hierarchical reference counting in accordance with an embodiment of the invention.

One embodiment of supporting a lookup structure for a file system implementing hierarchical reference counting is illustrated by an exemplary method 700 of FIG. 7 and further described in conjunction with system 800 of FIG. 8. When a file is cloned by a clone file operation, a cloned file is created. The cloned file will have a different file identifier than the original file. Because the cloned file is a clone of the file, some pages within the storage 806 may be shared between the file and the cloned file. However, lookup entries for those shared pages cannot be identified in relation to the cloned file if the lookup entries are indexed by file identifiers because the cloned file has a different file identifier than the file (e.g., the lookup entries for the page were indexed using the file identifier of the page, and not the file identifier of the cloned page).

Accordingly, hash identifiers are instead used to index lookup entries within the lookup structure 812. Hash identifier lists are maintained for files, such that a hash identifier list of a file may comprise a hash identifier of the file and hash identifiers inherited from ancestor files of the file (e.g., a parent file from which the file was cloned, a grandparent file from which the parent file was cloned, etc.). Thus, hash identifiers within the hash identifier list can be used to locate lookup entries associated with pages comprising data of the file, even if the lookup entries were originally associated with ancestor files. In this way, lookup entries within the lookup structure 812 for pages of an ancestor file (e.g., pages inserted into the storage 806 through the parent file) can be identified as being associated with a cloned file so that lookup structure 812 does not otherwise appear to be empty from the perspective of the cloned file.

During operation 702 of method 700 of FIG. 7, a first hash identifier and a first file identifier are assigned to a first file. Normally, just the first file identifier would be assigned to the first file, and used to index a lookup entry for a page of the first file within the lookup structure 812. This technique now also assigns the first hash identifier to the first file, which may be used to index the lookup entry. For example, a lookup entry for the first file may be inserted into the lookup structure 812. The lookup entry is inserted into the lookup structure 812 as a function of the first hash identifier, a level of the first file within the file system tree 810, and/or a file block number of the first file (e.g., a function of a hash of the first hash identifier, the level, and the file block number). In this way, the first hash identifier can be used to locate the lookup entry for the first file within the lookup structure 812.

During operation 704 of method 700 of FIG. 7, the first file is cloned to create a second file (a cloned file). Initially, the second file will reference the same pages as the first file because the second file comprises the same data as the first file. During operation 706 of method 700 of FIG. 7, a second hash identifier is assigned to the second file. Also, the second file is assigned (inherits) the first hash identifier of the first file. The first file retains the assignment of the first hash identifier, and is also assigned a third hash identifier. In this way, a first hash identifier list of the first file comprises the first hash identifier and the third hash identifier. A second hash identifier list of the second file comprises the first hash identifier inherited from the first file and the second hash identifier. As files are cloned, additional hash identifiers are assigned to files and are inserted into hash identifier lists of the files in order to track the hash identifiers (unique identifiers). The hash identifiers are inserted into the hash identifier lists according to an order of insertion. This ordering is tracked/identifiable because when certain operations are performed, the hash identifiers will be used for lookup into a lookup structure one at a time according to a particular order, such as from a most recently inserted hash identifier to a least recently inserted hash identifier. A primary hash identifier of a file may correspond to a particular hash identifier within a hash identifier list (e.g., a first hash identifier such as a most recently inserted hash identifier). In an embodiment, entries are inserted into the lookup table using the primary hash identifier of the file at the time of insertion.

In response to receiving a read operation targeting the second file, hash identifiers within the second hash identifier list are sequentially attempted one at a time according to a particular order (e.g., an ordering from a most recently assigned hash identifier to a least recently inserted hash identifier) for querying the lookup structure 812 in order to find a corresponding lookup entry within the lookup structure 812. If the corresponding lookup entry is located (e.g., a lookup entry corresponding to a page unique to the second file, which is indexed by the second hash identifier; a page shared between the second file and the first file, which is indexed by the first hash identifier), then the corresponding lookup entry is utilized for processing the read operation.

In response to receiving a write operation targeting the second file, a primary hash identifier (e.g., a most recently assigned hash identifier) within the second hash identifier list is used to query the lookup structure 812 for a corresponding lookup entry associated with the second file. In response to identifying the lookup entry, the lookup entry is used to process the write operation, otherwise, the file system tree 810 is traversed to determine a reference count for the page to utilize for determining how to process the write operation.

In some embodiments, a hash identifier list may be truncated to remove certain hash identifiers from the hash identifier list based upon a criteria being met. The criteria may correspond to a time interval, a threshold number of lookup entries being inserted into the lookup structure 812, etc. This will improve performance so that less than a threshold number of hash identifiers are used when attempting to locate a corresponding lookup entry within the lookup structure 812 before determining that no lookup entries match and that the file system tree 810 is to be traversed. In some embodiments, the hash identifier list is not truncated and is allowed to grow unbounded.

In some embodiments, pages belonging to the second file may be scavenged from the storage 806. In response to pages from the second file being scavenged, a lookup entry is modified. In an example of modifying the lookup entry, a primary hash identifier may be retained with a NULL pointer to indicate that older hash identifiers are invalid for this page of the particular file. In another example of modifying the lookup entry, any older hash identifier may be removed from a hash identifier list of the file.

In summary, with respect to handling file clone operations associated with a file system that utilizes hierarchical reference counting and a lookup structure (e.g., a buffer hash), a parent file is associated with a hash identifier (a unique identifier) in addition to an existing file identifier. When the parent file is cloned to create a cloned file, the cloned file inherits the hash identifier of the parent file, and the parent file and the cloned file are both assigned new hash identifiers. In this way, the hash identifiers are part of hash identifier lists, wherein a hash identifier list of a file comprises hash identifiers used to index lookup entries for pages that may comprise data a file. The combination of a hash identifier, a level within the file system tree 810, and a file block number are used to hash lookup entries into the lookup structure 812 in order to uniquely identify pages shared between the parent file and cloned files. The hash identifiers are used to prevent unnecessary lookup entry invalidation for parent and cloned files. In some embodiments, a write operation is limited to accessing a lookup entry matching a primary hash identifier, such as a most recently assigned hash identifier. A read operation can use any lookup entry matching any hash identifiers within a hash identifier list, and the hash identifiers are attempted sequentially one at a time in a particular order (e.g., from a most recently assigned hash identifier to a least recently assigned hash identifier). If a hash identifier is not found within lookup entries within the lookup structure 812, then a file clone operation was performed. In such a case, use of the lookup structure 812 is skipped, and a traversal of the file system tree 810 is performed. In an example, for a read operation, a list of hash identifiers are traversed to locate a lookup entry that corresponds to any of the hash identifiers, and then a file system tree is walked if no matching lookup entry is found. For a write operation, merely a primary identifier is used to locate a lookup entry that corresponds to the primary identifier, and then a file system tree is walked if no matching lookup entry is found, Each file identifier of files maintained by the file system 804 are unique, and thus there is ordinarily no sharing of the lookup entries 816 within the lookup structure 812 between pages and clones of those pages. This drawback can be circumvented by maintaining hash identifier lists, where a hash identifier list of a page will have a hash identifier of that page and any ancestor pages of the page (e.g., a parent page from which the page was cloned; a grandparent page from which the parent page was cloned; etc.). Thus, a hash identifier of a parent page within the hash identifier list can be used to identify a lookup entry for a page shared between the page and the parent page.

In some embodiments of utilizing hash identifier lists, a file (A) is assigned a hash identifier (1), which can be used to locate lookup entries 816 for pages comprising data of the file (A). The file (A) may be cloned to create a file (B). Both the file (A) and the file (B) will be assigned new hash identifiers, such as where the file (A) is assigned a hash identifier (2) and the file (B) is assigned a hash identifier (3). The file (B) will also inherit the hash identifier (1) from the file (A) as the parent file of the file (B). A first hash identifier list for the file (A) now comprises hash identifier (1) and hash identifier (2), and a second hash identifier list for the file (B) now comprises hash identifier (3) and hash identifier (1). Any lookup entries of shared pages between the file (A) and the file (B) can be identified using the hash identifier (1). Any newly written data to the file (A) will use the hash identifier (2) that is not shared with the file (B), and any newly written data to the file (B) will use the hash identifier (3) that is not shared with the file (A) because such data is not shared between the file (A) and the file (B).

The file (B) may be cloned to create a file (C). Both the file (B) and the file (C) will be assigned new hash identifiers, such as where the file (B) is assigned a hash identifier (4) and the file (C) is assigned a hash identifier (5). The file (C) will inherit the hash identifiers from the file (B), such as the hash identifier (3) and the hash identifier (1). The second hash identifier list for the file (B) now comprises hash identifier (4), hash identifier (3), and hash identifier (1), and a third hash identifier list for the file (C) comprises hash identifier (5), hash identifier (3), and hash identifier (1). Any lookup entries of shared pages between the file (A), the file (B), and the file (C) can be identified using the hash identifier (1). Any lookup entries of shared pages between the file (B) and the file (C), but not shared with the file (A), can be identified using the hash identifier (3). Any newly written data to the file (B) will use the hash identifier (4) that is not shared with the file (C), and any newly written data to the file (C) will use the hash identifier (5) that is not shared with the file (B) because such data is not shared between the file (C) and the file (B).

Figure 9:
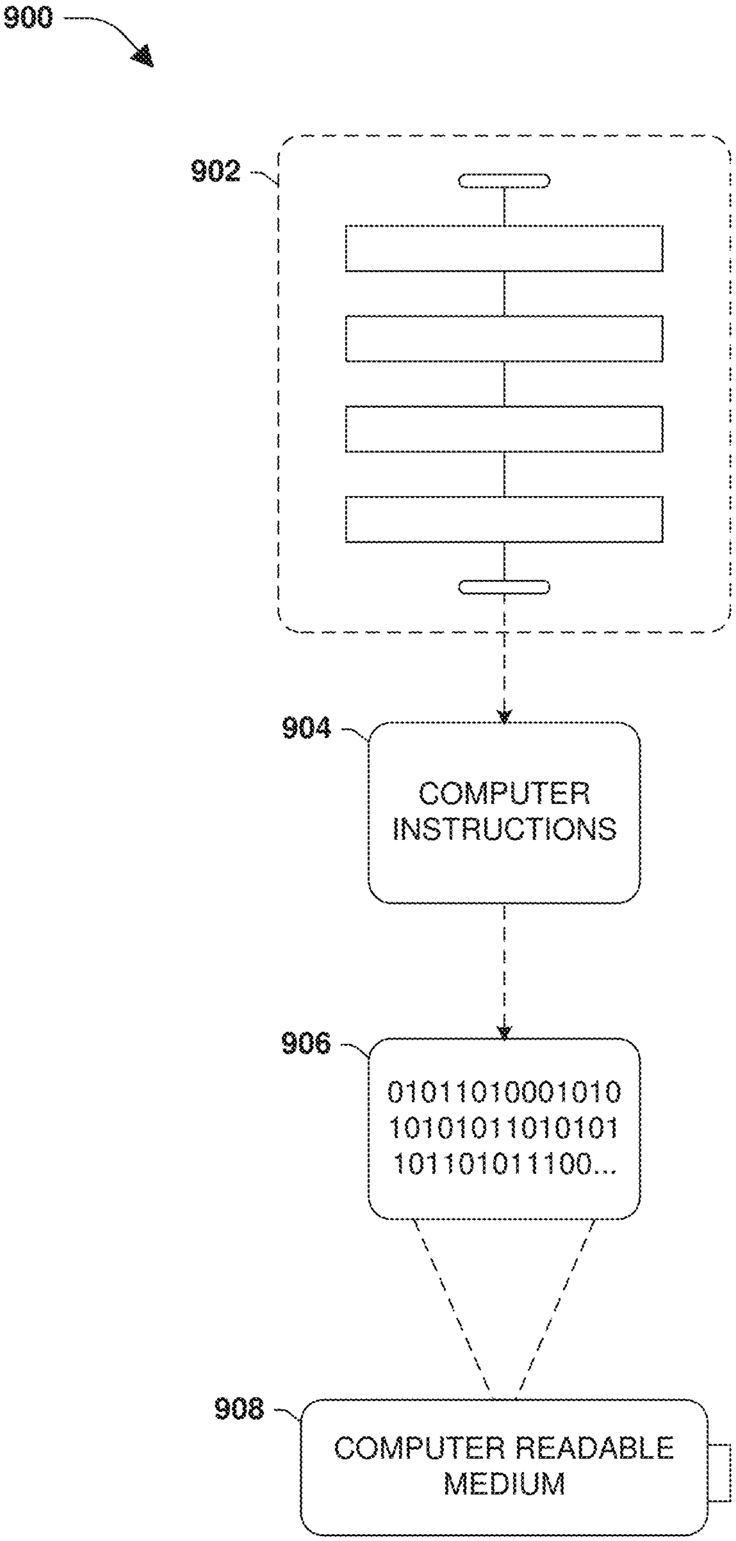
FIG. 9 is an example of a computer readable medium in which an embodiment of the invention may be implemented.

Still another embodiment involves a computer-readable medium 900 comprising processor-executable instructions configured to implement one or more of the techniques presented herein. An example embodiment of a computer-readable medium or a computer-readable device that is devised in these ways is illustrated in FIG. 9, wherein the implementation comprises a computer-readable medium 908, such as a compact disc-recordable (CD-R), a digital versatile disc-recordable (DVD-R), flash drive, a platter of a hard disk drive, etc., on which is encoded computer-readable data 906. This computer-readable data 906, such as binary data comprising at least one of a zero or a one, in turn comprises processor-executable computer instructions 904 configured to operate according to one or more of the principles set forth herein. In some embodiments, the processor-executable computer instructions 904 are configured to perform a method 902, such as at least some of the exemplary method 500 of FIG. 5, at least some of the exemplary method 600 of FIG. 6, and/or at least some of the exemplary method 700 of FIG. 7*m* for example. In some embodiments, the processor-executable computer instructions 904 are configured to implement a system, such as at least some of the exemplary system 400 of FIG. 4, at least some of the exemplary system 800 of FIG. 8, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (Saas) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW) s, DVDs, cassettes, magnetic tape, magnetic disk storage, optical or non-optical data storage devices and/or any other medium which can be used to store data.

Some examples of the claimed subject matter have been described with reference to the drawings, where like reference numerals are generally used to refer to like elements throughout. In the description, for purposes of explanation, numerous specific details are set forth in order to provide an understanding of the claimed subject matter. It may be evident, however, that the claimed subject matter may be practiced without these specific details. Nothing in this detailed description is admitted as prior art.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:

creating a snapshot of a file system implementing hierarchical reference counting for pages within storage;

receiving a snapshot restore operation to restore the file system to a state captured by the snapshot;

traversing a lookup structure to invalidate lookup entries that have entry generation counts greater than a file system info generation count of the snapshot; and in response the traversing the lookup structure to invalidate the lookup entries, utilizing the lookup structure to restore the file system to the state captured by the snapshot as a restored file system; and processing a write operation targeting a file of the restored file system by:

in response to identifying a match between a lookup entry clone generation count of a lookup entry for the file and an inode generation count of an inode for the file, utilizing the lookup entry to directly access a page storing the file; and in response to identifying a mismatch between the lookup entry clone generation count and the inode generation count, invalidating the lookup entry as being unusable and performing a file system tree traversal to identify an accurate reference count for processing the write operation.

2. The method of claim 1, comprising:

executing a snapshot operation to create the snapshot; and incrementing, as part of executing the snapshot operation, the file system info generation count stored within a filesystem info object.

3. The method of claim 2, wherein execution of the snapshot operation skips incrementing local reference counts of the pages within the storage and modifies parent reference counts instead of modifying the local references counts.

4. The method of claim 3, wherein the file system info generation count is incremented to ensure that entities, other than the snapshot, do not already have a reference to the page within the storage, and wherein execution of the snapshot operation skips incrementing local reference counts of the pages within the storage to ensure that data within a volume associated with the file system is not modified during creation of the snapshot.

5. The method of claim 1, comprising:

receiving a snapshot delete operation to delete the snapshot; and removing a file system info object associated with the snapshot to delete a generation count associated with the snapshot based upon execution of the snapshot delete operation.

6. The method of claim 1, comprising:

storing the lookup entry within the lookup structure; and indexing the lookup entry by a hash of a file identifier of the file.

7. The method of claim 1, comprising:

restoring the file system to the state captured by the snapshot as the restored file system.

8. The method of claim 7, comprising:

in response to receiving a read operation targeting the page associated with the restored file system, utilizing a file identifier to locate the lookup entry within the lookup structure for accessing the page.

9. The method of claim 1, comprising:

in response inserting the lookup entry into the lookup structure, setting the lookup entry clone generation count to a value of the inode generation count.

10. A non-transitory machine readable medium comprising instructions, which when executed by a machine, causes the machine to:

in response to receiving a snapshot restore operation to restore a file system implementing hierarchical reference counting for pages within storage to a state captured by a snapshot, traverse a lookup structure to invalidate lookup entries that have entry generation counts greater than a file system info generation count of the snapshot; and in response traversing the lookup structure to invalidate the lookup entries, utilize the lookup structure to restore the file system to the state captured by the snapshot as a restored file system; and process access to a file within the restored file system by:

in response to identifying a mismatch between a lookup entry clone generation count of a lookup entry for the file and an inode generation count of an inode for the file, invalidating the lookup entry as being unusable and performing a file system tree traversal to identify an accurate reference count for providing the access to the file.

11. The non-transitory machine readable medium of claim 10, wherein the instructions cause the machine to:

insert the lookup entry for the file into the lookup structure, wherein the lookup entry is inserted into the lookup structure as a function of a hash identifier by indexing the lookup entry into the lookup structure using the hash identifier in relation to hash identifiers of other lookup entries indexed into the lookup structure.

12. The non-transitory machine readable medium of claim 11, wherein the instructions cause the machine to:

insert the lookup entry into the lookup structure as a function of a level of the file within the file system tree of the restored file system by indexing the lookup entry into the lookup structure using the level within the file system tree in relation to levels of files within the file system tree of other lookup entries indexed into the lookup structure.

13. The non-transitory machine readable medium of claim 11, wherein the instructions cause the machine to:

insert the lookup entry into the lookup structure as a function of a file block number of the file within the restored file system.

14. The non-transitory machine readable medium of claim 10, wherein the instructions cause the machine to:

receive an operation targeting the file within the restored file system;

sequentially utilize hash identifiers within a hash identifier list according to an ordering of the hash identifiers to identify a corresponding lookup entry within the lookup structure for processing the operation.

15. A computing device implementing a node comprising:

a memory comprising machine executable code; and a processor coupled to the memory, the processor configured to execute the machine executable code to cause the computing device to:

create a snapshot of a file system implementing hierarchical reference counting for pages within storage;

receive a snapshot restore operation to restore the file system to a state captured by the snapshot;

traverse a lookup structure to invalidate lookup entries that have entry generation counts greater than a file system info generation count of the snapshot; and in response traversing the lookup structure to invalidate the lookup entries, utilize the lookup structure to restore the file system to the state captured by the snapshot as a restored file system; and process access to a file of the restored file system by:

in response to identifying a match between a lookup entry clone generation count of a lookup entry for the file and an inode generation count of an inode for the file, utilizing the lookup entry to directly access a page storing the file; and in response to identifying a mismatch between the lookup entry clone generation count and the inode generation count, invalidating the lookup entry as being unusable and performing a file system tree traversal to identify an accurate reference count for providing access to the file.

16. The computing device of claim 15, wherein the machine executable code causes the computing device to:

increment, as part of creating the snapshot, the file system info generation count stored within a filesystem info object.

17. The computing device of claim 16, wherein execution of a snapshot operation to create the snapshot skips incrementing local reference counts of the pages within the storage.

18. The computing device of claim 17, wherein the file system info generation count is incremented to ensure that entities, other than the snapshot, do not already have a reference to the page within the storage, and wherein execution of the snapshot operation skips incrementing local reference counts of the pages within the storage to ensure that data within a volume associated with the file system is not modified during creation of the snapshot.

19. The computing device of claim 15, wherein the machine executable code causes the computing device to:

receive a snapshot delete operation to delete the snapshot; and remove a file system info object associated with the snapshot to delete a generation count associated with the snapshot based upon execution of the snapshot delete operation.

20. The computing device of claim 15, wherein the machine executable code causes the computing device to:

store the lookup entry within the lookup structure comprising lookup entries indexed by hashes of file identifiers.

* * * * *